Oct. 30, 1951    F. F. RATHMELL    2,573,601
FISHERMAN'S KNIFE
Filed June 11, 1949
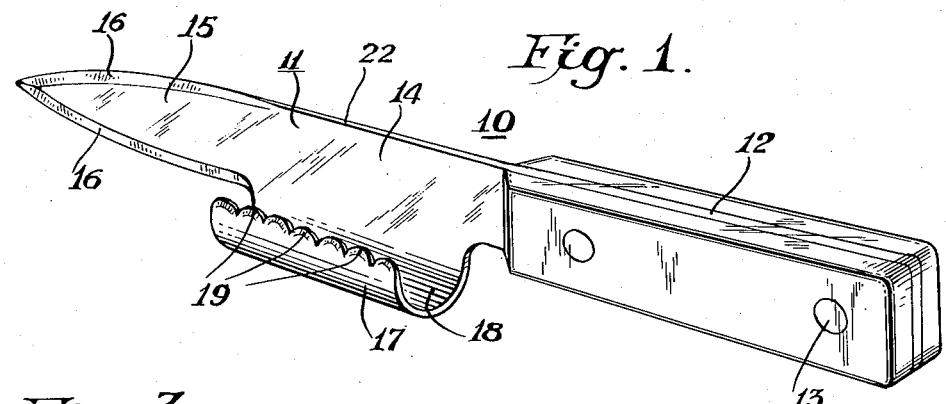
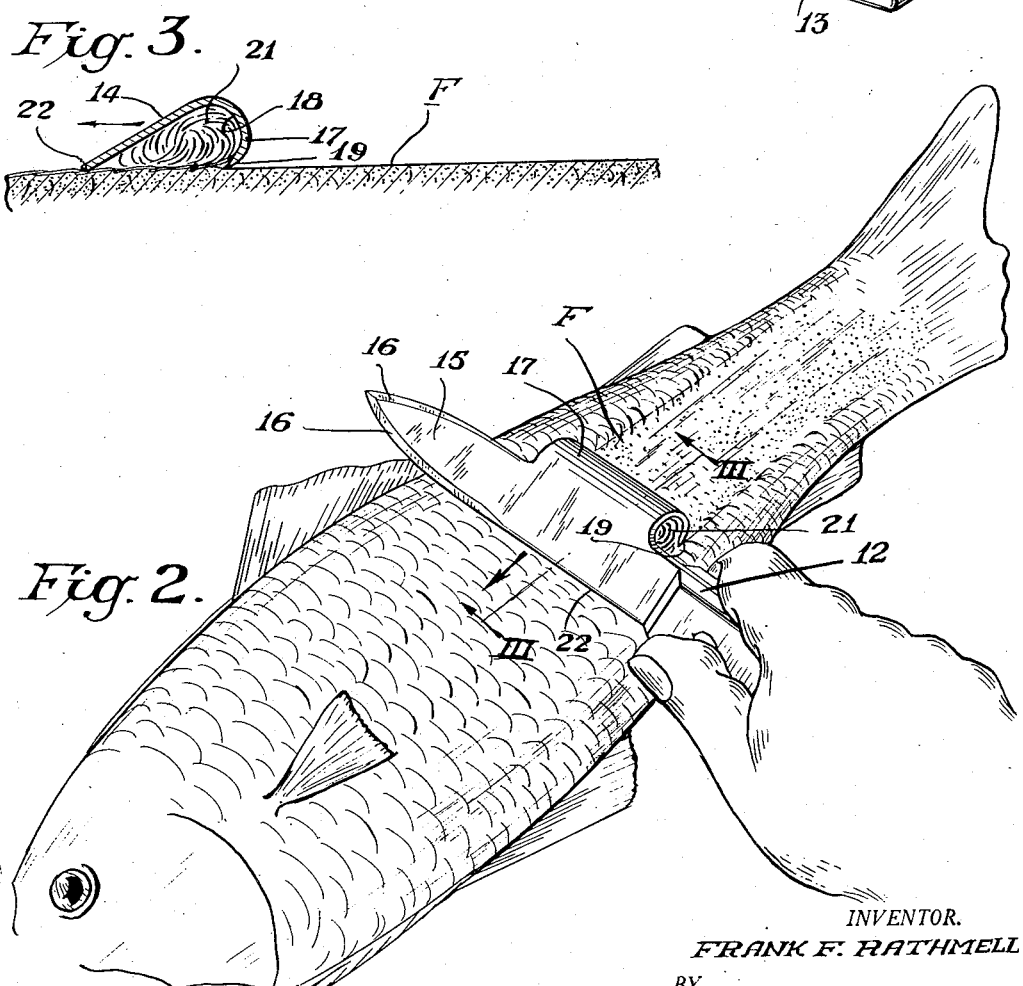
INVENTOR.
FRANK F. RATHMELL
BY
*Ralph T. French*
ATTORNEY Patented Oct. 30, 1951

2,573,601

UNITED STATES PATENT OFFICE 2,573,601

FISHERMAN'S KNIFE

Frank F. Rathmell, Wynnewood, Pa.

Application June 11, 1949, Serial No. 98,455

2 Claims. (Cl. 17—7)

This invention relates to knives, more particularly to a fisherman's knife, and has for an object to provide a knife having a novel combination of elements.

Another object of the invention is to provide a fisherman's knife suitable for stunning a fish, for scaling it and for cleaning it.

In previous devices of this type, intended for cleaning and scaling fish, no means has been provided for catching and retaining the scales as they are removed, with the result that the fisherman and his boat or the housewife and her sink have been well spattered with scales.

In the present invention, this problem has been solved by a novel relation of knife blade and scaling extension carried thereby, the scaling extension being so disposed with respect to the blade that the latter overlies and catches the scales as they are removed by the scaling extension.

Accordingly, another object of the invention is to provide a knife having a novel arrangement of blade and scaler.

A further object of the invention is to provide a channel-shaped scaler having a long leg and a short leg, the latter constituting a scaler and the longer leg overlying the shorter and preventing scattering of the scales removed by the shorter leg.

These and other objects are effected by the invention as will be apparent from the following specification and claims, taken in accordance with the accompanying drawings, forming a part thereof and in which:

Fig. 1 is a perspective view of a knife constructed in accordance with the invention;

Fig. 2 is a perspective view of the device in use as a scaler; and

Fig. 3 is a fragmentary sectional view, taken along the line III—III of Fig. 2, looking in the direction indicated by the arrows.

Referring now to the drawings in greater detail, the reference character 10 indicates, in its entirety, a knife embodying novel features of the invention and comprising a blade 11 having a handle 12 secured to an end portion thereof by suitable means, such as the rivets 13. The blade 11 includes an intermediate portion 14 and an end portion 15, the latter being provided with one or more cutting edges 16 suitable for opening and cleaning a fish, as well as for removing its head and tail.

The blade intermediate portion 14 includes a lateral extension 17 of U-shape or channel-shape in cross section and providing a trough 18 for catching and retaining fish scales, as hereinafter described.

The free edge of the extension 17 is toothed or serrated, as at 19, and the serrations are sufficiently sharp at their points to freely enter beneath the scales 21 of a fish F when drawn along the latter in the manner and direction indicated in Fig. 2.

As clearly shown in both Figs. 2 and 3, the intermediate portion 14 of the blade 11 projects forwardly of, and above, the channel or trough 18, thereby preventing scattering of the scales 21 as they are removed, and positively retaining them in the trough or channel, from which they may be readily removed by tipping the blade in water.

It should be noted that the edge of the blade intermediate portion 14 is preferably rounded, as at 22, sufficiently to permit the edge to freely slide over the scales 21 as the scaler is advanced.

A further feature of the invention lies in the fact that the rounded portion of the scaler extension may be used as the head of a hammer for stunning a fish as soon as it is caught and before it is placed in a creel or other container. To this end it is preferred that the blade and its extension 17 be made of relatively heavy gauge material, and steel of one-sixteenth inch thickness has been found suitable.

From the foregoing description it will be seen that the present invention incorporates a novel combination and relationship of knife blade and scaler, whereby the former acts as a shield and scale trap during use of the latter.

While the invention has been shown in but one form, it will be apparent that it is not so limited, but is susceptible of variations and modifications without departing from the spirit thereof.

What is claimed is:

1. In a device of the character described, a flat blade forming one leg of a U-shaped structure, an extension at one edge of said blade and forming the bend of the U-shaped structure which bend is of approximately 180 degrees extent, and a terminal portion on the extension and forming the other leg of the U-shaped structure, said terminal portion lying in a plane parallel to the plane of the blade and having its free edge serrated, the leg of the U-shaped structure formed by the terminal portion being materially shorter than the leg formed by the blade, whereby, when the device is moved with said serrated edge positioned in scale-removing relation to a fish with the blade disposed above and forwardly of the serrated extension, said blade will catch and retain the removed scales.

2. In a knife structure of the character described, a blade of elongated formation, said blade along one edge thereof for a limited portion thereof being provided with an outstanding formation disposed outwardly, and inwardly over the same edge portion of the blade, said inwardly disposed portion being serrated to provide fish scaling teeth.

FRANK F. RATHMELL.

REFERENCES CITED

The following references are of record in the file of this patent:

UNITED STATES PATENTS

| Number | Name | Date |
|---|---|---|
| D. 146,614 | Pelka et al. | Apr. 15, 1947 |
| 598,463 | Foster | Feb. 1, 1898 |
| 1,378,522 | Carter | May 17, 1921 |
| 1,518,538 | Munson | Dec. 9, 1924 |
| 2,109,859 | Cope | Mar. 1, 1938 |

FOREIGN PATENTS

| Number | Country | Date |
|---|---|---|
| 344,534 | Germany | Nov. 24, 1931 |